(12) United States Patent
Zhang et al.

(10) Patent No.: US 12,288,939 B2
(45) Date of Patent: Apr. 29, 2025

(54) PLUG, ELECTRICAL CONNECTOR AND TERMINAL DEVICE

(71) Applicant: AUTEL INTELLIGENT TECHNOLOGY CORP., LTD., Guangdong (CN)

(72) Inventors: Dengguo Zhang, Guangdong (CN); Yingjun Liu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 431 days.

(21) Appl. No.: 17/643,927

(22) Filed: Dec. 13, 2021

(65) Prior Publication Data

US 2022/0102878 A1  Mar. 31, 2022

Related U.S. Application Data

(63) Continuation of application No. PCT/CN2020/109560, filed on Aug. 17, 2020.

(30) Foreign Application Priority Data

Aug. 26, 2019  (CN) .......................... 201910790300.7

(51) Int. Cl.
 *H01R 11/24* (2006.01)
 *B60L 53/16* (2019.01)
 *H01R 13/629* (2006.01)
(52) U.S. Cl.
 CPC .............. *H01R 11/24* (2013.01); *B60L 53/16* (2019.02); *H01R 13/629* (2013.01); *H01R 2201/26* (2013.01)

(58) Field of Classification Search
 CPC .. H01R 11/24; H01R 13/629; H01R 2201/26; H01R 13/64; H01R 31/06; H01R 13/02;
 (Continued)

(56) References Cited

U.S. PATENT DOCUMENTS 3,466,453 A  9/1969  Greenberg
4,272,142 A  6/1981  Zapf
 (Continued)

FOREIGN PATENT DOCUMENTS

CN  203466319 U  3/2014
CN  203589808 U  5/2014
 (Continued)

OTHER PUBLICATIONS

Extended European Search Report dated Jun. 2, 2022; Application. No. 20859450.7.
 (Continued)

*Primary Examiner* — Briggitte R. Hammond (57) ABSTRACT

A plug, an electrical connector and a terminal device are provided. The plug is used for connecting to the terminal device related to a vehicle battery. One end of the plug can adapt to an output port of the terminal device, and the other end of the plug can be connected to the vehicle battery through wires, so that the terminal device can detect or perform charging and discharging operations on the vehicle battery. The plug includes an insulating housing, a first terminal arranged in the insulating housing, and at least a pair of second terminals arranged in the insulating housing. Each pair of second terminals being distributed in central symmetry with the first terminal as the center, and the polarity of the first terminal is the opposite of the polarity of the second terminals.

18 Claims, 4 Drawing Sheets

(58) Field of Classification Search
CPC ...... H01R 13/631; B60L 53/16; H02J 7/0045; Y02T 10/70; Y02T 10/7072; Y02T 90/14
See application file for complete search history.

(56) References Cited

U.S. PATENT DOCUMENTS

| | | |
|---|---|---|
| 4,726,786 A | 2/1988 | Hill |
| 4,829,223 A | 5/1989 | Brogerg et al. |
| 5,766,020 A | 6/1998 | Hughes |
| 2004/0145340 A1 | 7/2004 | Horenstein |
| 2016/0301176 A1 | 10/2016 | Mathews |

FOREIGN PATENT DOCUMENTS

| | | |
|---|---|---|
| CN | 206116666 U | 4/2017 |
| CN | 208315960 U | 1/2019 |
| CN | 110416821 A | 11/2019 |
| CN | 210201058 U | 3/2020 |
| WO | 2018068276 A1 | 4/2018 |

OTHER PUBLICATIONS

First office action of CN 2019107903007 dated Nov. 18, 2023.
International Search Report mailed Nov. 19, 2020; PCT/CN2020/109560 with English Translation.

PLUG, ELECTRICAL CONNECTOR AND TERMINAL DEVICE

CROSS-REFERENCE OF RELATED APPLICATIONS

This application is a continuation application of International Application No. PCT/CN2020/109560, filed on Aug. 17, 2020, which claims priority to Chinese Patent Application No. 201910790300.7, filed on Aug. 26, 2019 in China Patent Office, the entire contents of which are incorporated herein by reference.

TECHNICAL FIELD

The present application relates to the technical field of electrical connection, and in particular, to a plug, an electrical connector and a terminal device.

RELATED ART

In daily life, the plug and socket are often used for electrical connection. For example, when a vehicle battery is to be detected or charged, a terminal device, such as an emergency start power supply, is often electrically connected to the vehicle battery by means of an electrical connector. Specifically, a plug is provided at one end of the electrical connector, and the terminal device has an output port adapted to the plug.

However, when connecting the plug to the output port of the terminal device, a user needs to firstly identify the positive and negative polarities of the terminals of the plug, and then plug the output port accordingly, so as to prevent reverse connection of the plug that causes accidents such as short circuit. This makes the user's operation very inconvenient, and affects the user's use experience.

SUMMARY OF THE DISCLOSURE

An object of the present disclosure is to provide a plug, an electrical connector having the plug, and a terminal device adapted to the plug to solve the technical problem that the plug of existing technologies cannot be electrically connected to a terminal device by both forward plugging or reverse plugging.

The present disclosure solves the technical problem with the following technical solution:
  a plug, the plug being used for connection of a terminal device related to a vehicle battery, one end of the plug being fit into an output port of the terminal device while the other end of the plug being connected to the vehicle battery through two wires so as to enable the terminal device to detect or charge or discharge the vehicle battery;
  the plug including: an insulating housing;
  a first terminal, arranged in the insulating housing; and
  at least one pair of second terminals, arranged in the insulating housing, each pair of second terminals being distributed in central symmetry with the first terminal as the center;
  the first terminal is opposite in polarity to the second terminals;
  the first terminal is connectable to a terminal of the vehicle battery of the same polarity as the first terminal via a first wire;
  the at least one pair of second terminals are connectable to the other terminal of the vehicle battery of the same polarity as the at least one pair of second terminals via a second wire;
  when the plug is fit into the output port, the first terminal is connected to one of a positive electrode and negative electrode of an internal battery in the terminal device of the same polarity as the first terminal, and the at least one pair of second terminals are connected to one of the positive electrode and the negative electrode of the internal battery of the same polarity as the second terminals, so that the positive electrode and the negative electrode of the internal battery are connected to the vehicle battery via the plug and the two wires;
  wherein the plug is fit into the output port in either of a first direction and a second direction, the first direction being at 180 degrees from the second direction with the first terminal as a rotation center.

As a further improvement of the above technical solution, the plug further includes at least one pair of third terminals, arranged in the insulating housing, wherein each pair of third terminals are distributed in central symmetry with the first terminal as the center;
  the third terminals are of the same polarity as the first terminal, and the third terminals are connectable to the terminal of the vehicle battery of the same polarity as the first terminal via the first wire; and
  when the plug is fit into the output port, one of the positive electrode and the negative electrode of the internal battery of the same polarity as the first terminal is connected to the third terminals.

As a further improvement of the above technical solution, all the third terminals are arranged in a row.

As a further improvement of the above technical solution, the first terminal, all the second terminals, and all the third terminals are arranged in a row.

As a further improvement of the above technical solution, the plug further includes at least one pair of first signal terminals, each pair of first signal terminals being distributed in central symmetry with the first terminal as the center;
  the first signal terminals are connectable to the terminal of the vehicle battery of the same polarity as the first terminal via the first wire, and when the plug is fit into the output port, one of the positive electrode and the negative electrode of the internal battery of the same polarity as the first terminal is connected to the first signal terminals; or the first signal terminals are connectable to the terminal of the vehicle battery of the same polarity as the second terminals via the second wire, and when the plug is fit into the output port, one of the positive electrode and the negative electrode of the internal battery of the same polarity as the second terminals is connected to the first signal terminals.

As a further improvement of the above technical solution, one end of the insulating housing is provided with a plug slot, and the first terminal and all the second terminals are accommodated in the plug slot.

As a further improvement of the above technical solution, the plug further includes a flexible interconnecting piece connected to one end, away from the plug slot, of the insulating housing.

As a further improvement of the above technical solution, the insulating housing is smaller than the flexible interconnecting piece in cross-sectional area in a part where the insulating housing is joint with the flexible interconnecting piece.

As a further improvement of the above technical solution, the flexible interconnecting piece is made of polyvinyl chloride.

As a further improvement of the above technical solution, the insulating housing is made of nylon and glass fibers.

As a further improvement of the above technical solution, the first terminal includes a first fixing portion and first holding portions, one end of the first fixing portion is fixed to the insulating housing, and the other end of the first fixing portion is connected to at least two first holding portions, two adjacent first holding portions having a gap therebetween.

As a further improvement of the above technical solution, all the first holding portions of the same first terminal are arranged in a circle.

As a further improvement of the above technical solution, the second terminal includes a second fixing portion and second holding portions, one end of the second fixing portion is fixed to the insulating housing, and the other end of the second fixing portion is connected to at least two second holding portions, two adjacent second holding portions having a gap therebetween.

As a further improvement of the above technical solution, all the second holding portions of the same second terminal are arranged in a circle.

The present disclosure further solves the technical problem with the following technical solution:

an electrical connector, including a first wire, a second wire and the plug described above, the first terminal being connected to the first wire which is connectable to the terminal of the vehicle battery of the same polarity as the first terminal, and the at least one pair of second terminals being connected to the second wire which is connectable to the terminal of the vehicle battery of the same polarity as the second terminals.

As a further improvement of the above technical solution, the electrical connector further includes a first clamp and a second clamp, the first clamp being electrically connected to the first wire and used for fixedly connecting the terminal of the vehicle battery of the same polarity as the first terminal, the second clamp being electrically connected to the second wire and used for fixedly connecting the terminal of the vehicle battery of the same polarity as the second terminals.

The present disclosure further solves the technical problem with the following technical solution:

A terminal device for detecting or charging/discharging a vehicle battery, the terminal device including an internal battery, the terminal device being provided with an output port, the output port including:
a base,
a fourth terminal, arranged on the base; and
at least one pair of fifth terminals, arranged on the base, each pair of fifth terminals being distributed in central symmetry with the fourth terminal as the center;
the fourth terminal is opposite in polarity to the fifth terminals;
wherein the fourth terminal is connected to one of positive electrode and the negative electrode of the internal battery, and the at least one pair of fifth terminals are connected to the other of the positive electrode and the negative electrode of the internal battery; and
when the terminal device detects or charges or discharges the vehicle battery, the fourth terminal is connected to a terminal of the vehicle battery of the same polarity as the fourth terminal, and the at least one pair of fifth terminals are connected to a terminal of the vehicle battery of the same polarity as the at least one pair of fifth terminals.

As a further improvement of the above technical solution, the electrical connector further includes at least one pair of sixth terminals, arranged on the base, each pair of sixth terminals being distributed in central symmetry with the fourth terminal as the center;
the sixth terminals are of the same polarity as the fourth terminal, and the sixth terminals are connectable to a terminal of the vehicle battery of the same polarity as the fourth terminal;
when the terminal device detects or charges or discharges the vehicle battery, the sixth terminal is connected to the terminal of the vehicle battery of the same polarity as the fourth terminal.

As a further improvement of the above technical solution, all the sixth terminals are arranged in a row.

As a further improvement of the above technical solution, the fourth terminal, all the fifth terminals, and all the sixth terminals are arranged in a row.

As a further improvement of the above technical solution, the electrical connector further includes at least one pair of second signal terminals, each pair of second signal terminals being distributed in central symmetry with the fourth terminal as the center;
the second signal terminals are connected to one of the positive electrode and the negative electrode of the internal battery of the same polarity as the fourth terminal; or, the second signal terminals are connected to one of the positive electrode and the negative electrode of the internal battery of the same polarity as the at least one pair of fifth terminals.

As a further improvement of the above technical solution, one end of the fourth terminal away from a joint of the fourth terminal and the base is provided with a first clamping hole; and/or one end of the fifth terminal away from a joint of the fifth terminal and the base is provided with a second clamping hole.

The present disclosure has the following beneficial effects: an embodiment of the present disclosure provides a plug including an insulating housing, and a first terminal and a pair of second terminals fixedly connected to the insulating housing, the pair of second terminals being in central symmetry with the first terminal as the center, the first terminal being opposite in polarity to the second terminals.

As the pair of second terminals are symmetrically distributed with the first terminal as the center, the plug provided by the embodiment of the present disclosure, no matter whether it is forwardly or reversely plugged, has the first terminal in the center to mate with a terminal of the same polarity of a socket adapted to the plug, and both the second terminals one the outer side to mate with a terminal of the same polarity of the socket adapted to the plug. Thus, the plug provided by the embodiment of the present disclosure can be electrically connected to the socket normally no matter whether the plug is forwardly or reversely plugged.

BRIEF DESCRIPTION OF THE DRAWINGS

One or more embodiments are illustrated by way of example in the accompanying drawings, and these illustrations are not to be construed as limiting the embodiments. Elements in the figures having the same reference numerals represent like elements, and unless otherwise specified, the figures in the accompanying drawings are not necessarily drawn to scale.

DETAILED DESCRIPTION OF THE DISCLOSURE

To facilitate understanding, the present disclosure will be described in more detail below with reference to the accompanying drawings and specific embodiments. It should be noted that that when an element is referred to as being "secured" to another element, it may be directly on the other element or intervening elements may be present. When an element is referred to as being "connected" to another element, it may be directly connected to the other element or intervening elements may be present. The terms "vertical", "horizontal", "left", "right", "inner", "outer", and the like are used herein for descriptive purposes only.

Unless defined otherwise, all technical and scientific terms used herein have the same meaning as commonly understood by those of ordinary skill in the art to which this disclosure belongs. The terminology used herein is for the purpose of describing particular embodiments only and is not intended to be limiting of the disclosure. As used herein, the term "and/or" includes any and all combinations of one or more of the associated listed items.

Furthermore, the features of various embodiments of the present disclosure described below can be combined as long as they do not conflict with each other.

In this specification, "mounting" includes welding, screwing, snapping, gluing, etc. to fix or restrain an element or device in a specific position or place, the element or device may be fixed in a specific position or place or may be movable within a limited range, and the element or device may or may not be detachable after being fixed or restrained in a specific position or place, which is not restricted in the embodiments of the present disclosure.

Figure 1:
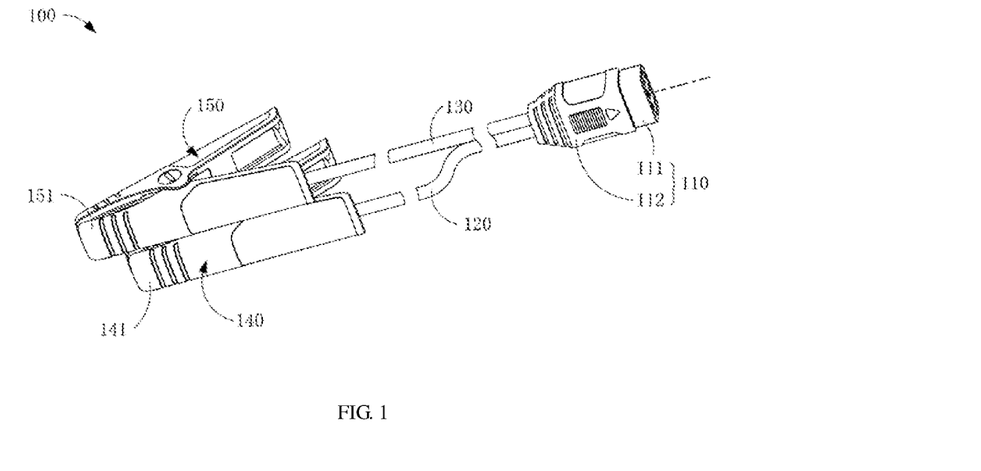
FIG. 1 shows a perspective view of an electrical connector according to an embodiment of the present disclosure in one direction.
Figure 2:
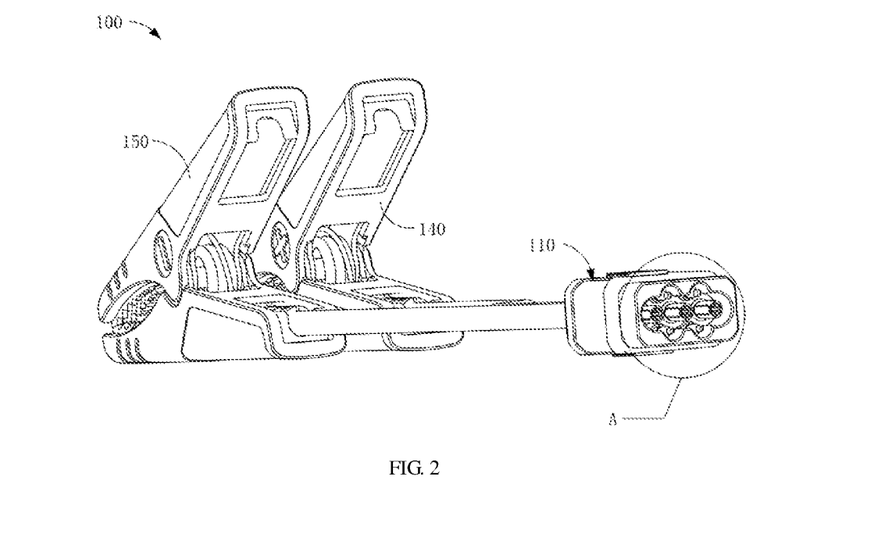
FIG. 2 shows a perspective view of the electrical connector of FIG. 1 in another direction.
Figure 3:
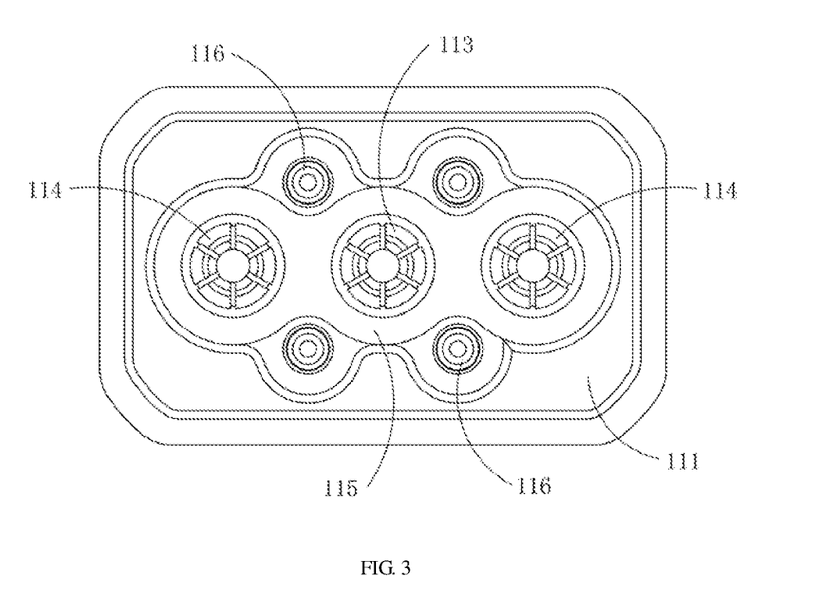
FIG. 3 shows a front view of a plug in FIG. 1.

Referring to FIGS. 1 to 3, perspective views of an electrical connector in two directions and a front view of a plug according to an embodiment of the disclosure are shown, and the electrical connector 100 includes a plug 110, a first wire 120, a second wire 130, a first clamp 140, and a second clamp 150. One end of the first wire 120 is connected to the plug 110 and the other end is connected to the first clamp 140, and one end of the second wire 130 is connected to the plug 110 and the other end is connected to the second clamp 150.

For the plug 110, with reference to FIGS. 1 and 3, and in conjunction with FIG. 2, the plug 110 includes an insulating housing 111, a flexible interconnecting piece 112 fixedly connected to one end of the insulating housing 111, and a first terminal 113 and second terminals 114 provided at the other end of the insulating housing 111.

Among others, a plug slot 115 is provided at one end of the insulating housing 111 for accommodating the first terminal 113 and the second terminals 114, so as to prevent the defect that the first terminal 113 and the second terminals 114 are exposed and protrude out of the insulating housing 111 and are easily damaged. The flexible interconnecting piece 112 is connected to one end of the insulating housing 111 away from the plug slot 115, and the flexible interconnecting piece 112 is larger than the insulating housing 111 in cross-sectional area and covers the whole cross-section of the insulating housing 111 in a part where the flexible interconnecting piece 112 is joint with the insulating housing 111. The upper and lower surfaces of the flexible interconnecting piece 112 are provided with anti-slip threads, so as to provide convenience for a user to insert and remove the plug 110 by hand. The insulating housing 111 may be made of a material selected from insulating materials such as nylon, plastic, rubber, etc. In this embodiment, the insulating housing 111 is made of a mixture of nylon-6 and glass fibers. Specifically, a certain amount of glass fibers is added into nylon-6 to improve the properties such as strength, rigidity and thermal stability. The flexible interconnecting piece 112 may be made of a material selected from insulating materials such as plastic, rubber, etc., and in this embodiment, the flexible interconnecting piece 112 is preferably made of PVC (Polyvinyl chloride) plastic.

Figure 4:
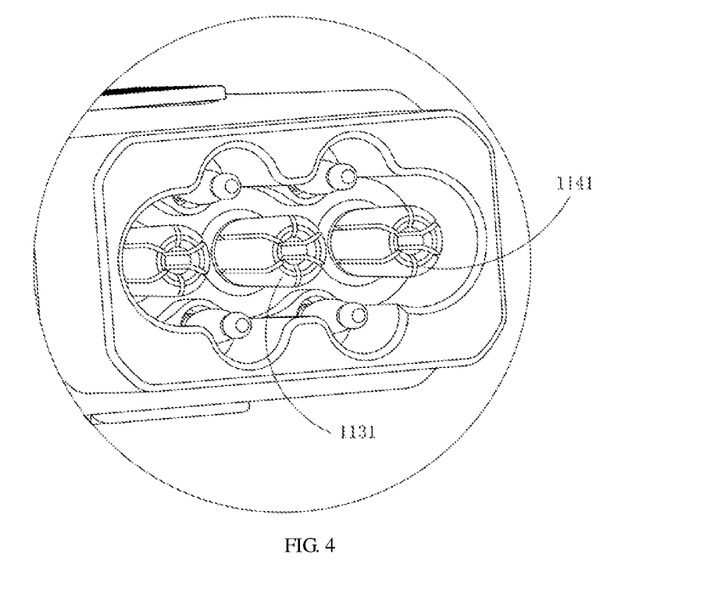
FIG. 4 shows a partially enlarged schematic diagram at A in FIG. 2.

With regard to the first terminal described above, referring to FIG. 4, which shows a partially enlarged schematic diagram at A in FIG. 2, and in conjunction with FIGS. 1 to 3, the first terminal 113 is arranged in the plug slot 115 and extends in the depth direction of the plug slot 115. The first terminal 113 includes a first fixing portion (not shown) and first holding portions 1131, one end of the first fixing portion is fixedly connected to the insulating housing 111, and the other end is connected to six first holding portions 1131. The six first holding portions 1131 are arranged in parallel and forms a circle, and two adjacent first holding portions 1131 have a gap therebetween. In this embodiment, the first holding portions 1131 extend in the depth direction of the plug slot 115, and the first fixing portion also extends in the depth direction of the plug slot 115. It will be appreciated that in other embodiments of the present disclosure, the first holding portions 1131 and the first fixing portion also may extend in other directions. With the first holding portions 1131, when the first terminal 113 is fit into a clamping hole of an external terminal, the first holding portions 1131 can be elastically moved closer toward the center under the restriction of the size of the clamping hole, so that a certain pre-tightening force is generated in the radial direction between the first holding portions 1131 and the wall of the clamping hole, thereby making the plug-in connection of the first terminal 113 firmer. It will be appreciated that the number of the first holding portions 1131 is not limited to six as in the embodiment described above, but may be any number greater than two, as long as there is a certain gap between adjacent two holding portions.

With regard to the pair of second terminals 114 described above, with particular reference to FIGS. 3 and 4, and in conjunction with FIGS. 1 and 2, the second terminals 114 are also arranged in the plug slot 115 and extend along the depth direction of the plug slot 115, the pair of second terminals 114 being distributed in central symmetry with the first terminal 113 as the center. The second terminal 114 substantially has the same structure as the first terminal 113, and includes a second fixing portion (not shown) and second holding portions 1141, one end of the second fixing portion is fixedly connected to the insulating housing 111, and the other end is connected to six second holding portions 1141. The six second holding portions 1141 are arranged in parallel and form a circle, and and two adjacent second holding portions 1141 have a gap therebetween. In this embodiment, the second holding portions 1141 extend in the depth direction of the plug slot 115, and the second fixing portion also extends in the depth direction of the plug slot 115. It will be appreciated that in other embodiments of the present disclosure, the second holding portions 1141 and the second fixing portion also may extend in other directions. With the second holding portions 1141, when the second terminal 114 is fit into a clamping hole of an external terminal, the second holding portions 1141 can be elastically moved closer toward the center under the restriction of the size of the clamping hole, so that a certain pre-tightening force is generated in the radial direction between the second holding portions 1141 and the wall of the clamping hole, thereby making the plug-in connection of the second terminal 114 firmer. It will be appreciated that the number of the second holding portions 1141 is not limited to six as in the embodiment described above, but may be any number greater than two, as long as there is a certain gap between adjacent two second holding portions 1141. The second terminals 114 are opposite in polarity to the first terminal 113, and in some embodiments of the present disclosure, the first terminal 113 is a positive terminal, and the second terminals 114 are negative terminals; in other embodiments of the present disclosure, the first terminal 113 is a negative terminal, and the second terminals 114 are positive terminals.

With regard to the first wire 120 and the second wire 130, referring to FIG. 1, one end of the first wire 120 is connected to the flexible interconnecting piece 112 and also electrically connected to the first terminal 113; and the other end of the first wire 120 is connected to the first clamp 140 and also electrically connected to a first clamping portion of the first clamp. One end of the second wire 130 is connected to the flexible interconnecting piece 112, and also electrically connected to the second terminals 114; and the other end of the second wire 130 is connected to the second clamp 150 and also electrically connected to a second clamping portion the second clamp 150.

With regard to the first clamp 140 and second clamp 150, referring to FIGS. 1 and 2, the first clamp 140 and the second clamp 150 are same in shape and structure, and are in the shape of a clip as a whole for clamping an external device, such as a terminal (not shown). One end of the first clamp 140 away from the first wire 120 is a first clamping portion 141, and the first clamping portion 141 is made of metal such that the first clamp 140 may be electrically connected to the external device while clamping the external device, which is convenient. One end of the second clamp 150 away from the second wire 130 is a second clamping portion 151, and the second clamping portion 151 is made of metal such that the second clamp 150 may be electrically connected to the external device while clamping the external device, which is convenient.

Further, in order to enable the electrical connector 100 to transmit signals while providing electrical connection, the electrical connector 100 further includes at least one pair of first signal terminals 116. Specifically, referring to FIG. 3, two pairs of first signal terminals 116 are accommodated in the above-mentioned plug slot 115, the two first signal terminals 116 in each pair of first signal terminals 116 being distributed in central symmetry with the first terminal 113 as the center. Each pair of first signal terminals 116 is electrically connected to either the first wire 120 or the second wire 130.

An electrical connector provided by the embodiment described above includes a plug 110, a first wire 120, a second wire 130, a first clamp 140, and a second clamp 150, wherein the plug 110 includes an insulating housing 111, and a first terminal 113 and a pair of second terminals 114 fixedly connected to the insulating housing 111, the pair of second terminals 114 being in central symmetry with the first terminal 113 as the center, the first terminal 113 being opposite in polarity to the second terminals 114. Therefore, according to the electrical connector provided by the embodiments of the disclosure, when the plug 110 is to be fit into an output port of an external terminal device (not shown), if the plug is plugged in a forward direction, the first terminal 113 is in the center to mate with a terminal of the same polarity of the output port, and the second terminals 114 are on the outer side to mate with a terminal of the same polarity of the output port, where the "forward direction" is defined as a first direction; and when the plug is inserted in a reverse direction, the whole plug 110 rotates 180 degrees with the first terminal as the rotation center, the first terminal 113 is still in the center to made with the terminal of the same polarity of the output port, and the two second terminals 114 are still on the outer side to mate with the terminal of the same polarity of the output port, where the "reverse direction" is defined as a second direction. Thus, the plug can be electrically connected normally no matter whether the plug is forwardly or reversely plugged.

Although there is only one pair of second terminals in the embodiment described above, it will be appreciated that: there may be two or more pairs of second terminals, and the two or more pairs of second terminals may be arranged in one row with the first terminal serving as a symmetry center or in a plurality of rows with the first terminal serving as a symmetry center, where lines formed by each row of the second terminals intersect at the first terminal.

Figure 5:
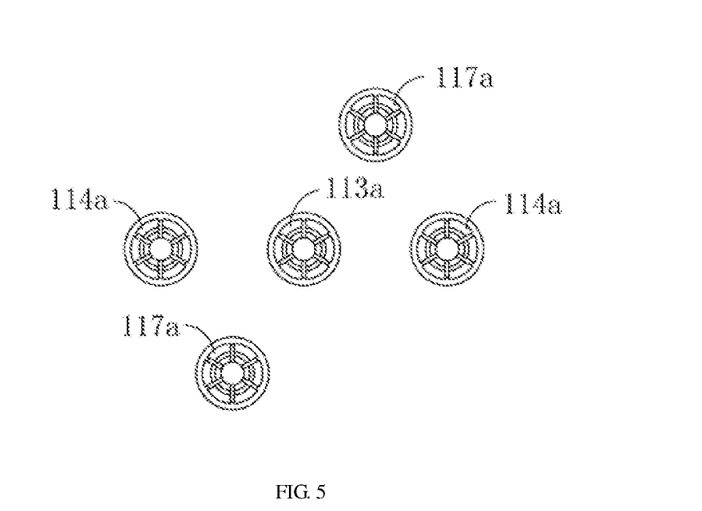
FIG. 5 shows a schematic diagram showing an arrangement of terminals of a plug according to another embodiment of the present disclosure.
Figure 6:
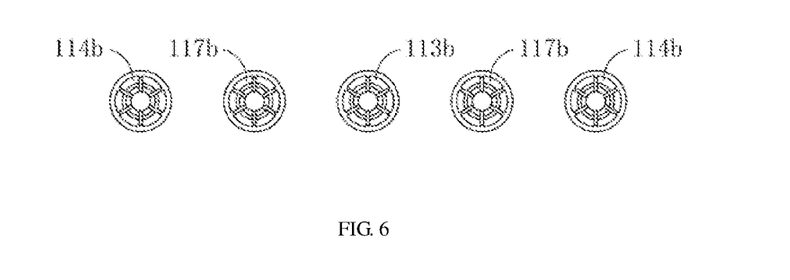
FIG. 6 shows a schematic diagram showing an arrangement of terminals of a plug according to yet another embodiment of the present disclosure.
Figure 7:
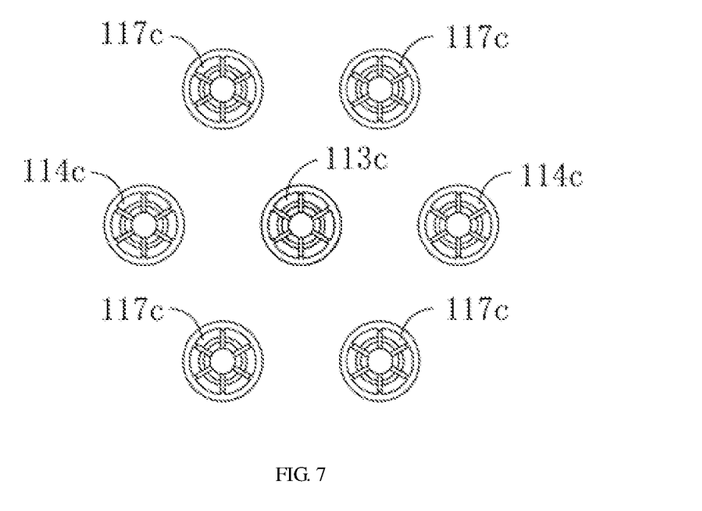
FIG. 7 shows a schematic diagram showing an arrangement of terminals of a plug according to still another embodiment of the present disclosure.

Referring to FIGS. 5 to 7, which show schematic diagrams showing arrangements of terminals of three other plugs provided in the present disclosure. In order to facilitate a simple reading of the figures, none of the afore-mentioned figures shows the insulating housing, and only arrangements of the terminals are shown. The three plugs mainly differ from the plug provided in the embodiment described above in:

the plug of the first embodiment includes only one first terminal, and one pair of second terminals; and the three plugs include a third terminal in addition to the first and second terminals.

First, referring to FIG. 5, the plug includes a first terminal 113a, a pair of second terminals 114a, and a pair of third terminals 117a, the pair of third terminals 117a being arranged in the insulating housing and accommodated in the above-mentioned plug slot, and the two third terminals 117a of the pair of third terminals 117a being distributed in central symmetry with the first terminal 113a as the center. The third terminals 117a have the same polarity as the first terminal 113a, i.e., the third terminals 117a are electrically connected to the first wire and the first clamp. Taking the first terminal being a positive terminal as an example, the positive terminals in this embodiment is more than the positive terminals in the first embodiment, so that even in the case where the first terminal 113a is poorly contacted or damaged, the electrical connection still may be normally provided with the third terminals. It will be appreciated that there may be a plurality of pairs of third terminals, and in some embodiments, the plurality of pairs of third terminals are arranged in a row.

Next, referring to FIG. 6, the plug includes a first terminal 113b, a pair of second terminals 114b, and a pair of third terminals 117b, the pair of third terminals 117b being arranged in the insulating housing and accommodated in the above-mentioned plug slot, and the two third terminals 117b of the pair of third terminals 117b being distributed in central symmetry with the first terminal 113b as the center. The third terminals 117b have the same polarity as the first terminal 113b, i.e., the third terminals 117b are electrically connected to the first wire and the first clamp. The plug of this embodiment mainly differs from the plug of the second embodiment in that, in the second embodiment, the second terminals and the third terminals are not arranged in a row, while the second terminals 114b and the third terminals 117b in this embodiment are arranged in a row with the first terminal 113b as the center. It will be appreciated that there may be a plurality of pairs of third terminals, and the plurality of pairs of third terminals are arranged in a row with the second terminals and the first terminal.

Finally, referring to FIG. 7, the plug includes a first terminal 113c, a pair of second terminals 114c, and two pairs of third terminals 117c, the two pairs of third terminals 117c being arranged in the insulating housing, and the two third terminals 117c of each pair of third terminals 117c being distributed in central symmetry with the first terminal 113c as the center. The third terminals 117c have the same polarity as the first terminal 113c, i.e., the third terminals 117c are electrically connected to the first wire and the first clamp. The plug of this embodiment mainly differs from the plug of the second embodiment in that, in this embodiment, there are two pairs of second terminals 114c, and the two pairs of third terminals are not arranged in a row, but lines formed between each pair of third terminals intersect at the first terminal 113c.

It will be appreciated that those skilled in the art will be able to make brief variations on the three plug embodiments provided above, for example, there may be more than two pairs of second terminals, and the more than two pairs of second terminals may be arranged in a row or in multiple rows.

Figure 8:
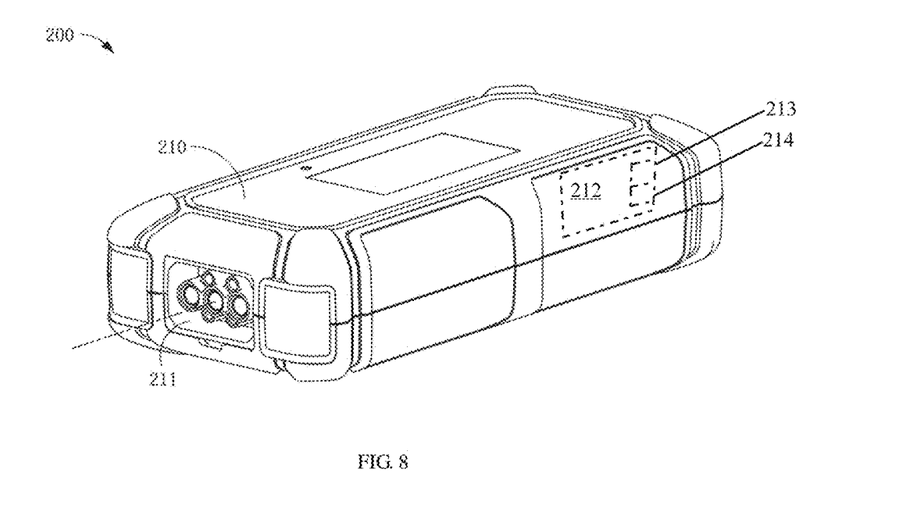
FIG. 8 shows a perspective view of a terminal device according to an embodiment of the present disclosure in one direction.
Figure 9:
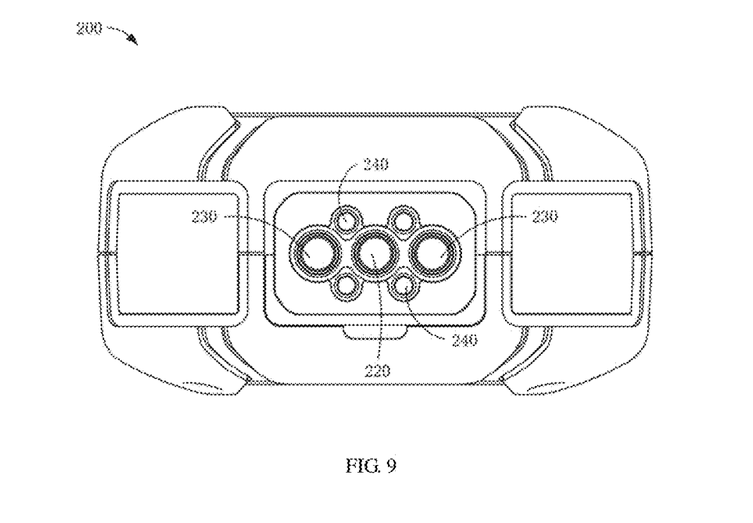
FIG. 9 shows a front view of the terminal device of FIG. 8.

Further, referring to FIGS. 8 and 9, the present disclosure further provides a terminal device 200 including a base 210, an internal battery 212, a circuit control module (not shown), a fourth terminal 220, and a pair of fifth terminals 230, based on the same inventive concept. The internal battery is fixedly arranged in the base 210; the circuit control module is fixedly arranged in the base 210 and is connected to the internal battery; the fourth terminal 220 is fixedly connected to the base 210, one end of the fourth terminal 220 is electrically connected to one of a positive electrode 213 and a negative electrode 214 of the internal battery via the circuit control module, and the other end extends out of the base 210; the fifth terminals 230 are fixedly connected to the base 210, one ends of the fifth terminals are electrically connected to the other of the positive electrode 213 and the negative electrode 214 of the internal battery via the circuit control module, and the other ends protrude out of the base 210. The base 210, the circuit control module, the fourth terminal 220 and the fifth terminals 230 together form an output port of the terminal device 200, and the output port is adapted to one end of the plug provided with the first terminal and the second terminals described in the first embodiment. It will be appreciated that the fourth terminal 220 and/or the fifth terminal 230 may be directly fixedly connected to the base 210 or may be indirectly fixedly connected to the base 210 by being fixedly connected to the circuit control module.

With regard to the base 210, referring to FIG. 8, and in conjunction with FIGS. 1 to 7, the whole base 210 is box-shaped, with one end provided with an accommodating slot 211, and the shape of the accommodating slot 211 is adapted to the shape of the insulating housing 111 of the plug 110. The accommodating slot 211 is used for accommodating the fourth terminal 220 and the fifth terminals 230, so as to prevent the defect that the fourth terminal 220 and the fifth terminals 230 are exposed and protrude out of the base 210 and are easily damaged.

With regard to the fourth terminal 220, referring to FIG. 9, and in conjunction with FIGS. 1 to 8, the fourth terminal 220 is arranged in the accommodating slot 211, and extends in the depth direction of the accommodating slot 211. One end of the fourth terminal 220 away from a joint of the fourth terminal 220 and the base 210 is provided with a first clamping hole which is adapted to the first holding portions 1131 of the first terminal 113 of the plug. When the first holding portions 1131 are inserted into the first climbing hole, the first holding portions 1131 are elastically moved closer toward the center under the restriction of the size of the first clamping hole, so that a certain pre-tightening force is generated in the radial direction between the first holding portions 1131 and the fourth terminal 220, thereby making the plug-in connection of the first terminals 113 and the fourth terminal 220 firmer.

With regard to the pair of fifth terminals 230, with particular reference to FIG. 9, and in conjunction with FIGS. 1 to 8, the fifth terminals 230 are also arranged in the accommodating slot 211 and extend along the depth direction of the accommodating slot 211, the pair of fifth terminals 230 being distributed in central symmetry with the fourth terminal 220 as the center. The structure of the fifth terminal 230 is substantially the same as that of the fourth terminal 220, and one end of the fifth terminal 230 away from a joint of the fifth terminal 230 and the base 210 is provided with a second clamping hole which is adapted to the second holding portions 1141 of the second terminal of the plug. When the second holding portions 1141 are inserted into the second climbing hole, the second holding portions 1141 are elastically moved closer toward the center under the restriction of the size of the second clamping hole, so that a certain pre-tightening force is generated in the radial direction between the second holding portions 1141 and the fifth terminal 230, thereby making the plug-in connection of the second terminals 114 and the fifth terminal 230 firmer. The fifth terminals 230 are opposite in polarity to the fourth terminal 220, where the fourth terminal 220 has the same polarity as the first terminal 113, and the fifth terminals 230 have the same polarity as the second terminals 114. In some embodiments of the present disclosure, the fourth terminal 220 is a positive terminal and is connected to the positive electrode of the internal battery described above, and the fifth terminals 230 are negative terminals and are connected to the negative electrode of the internal battery. In other embodiments of the present disclosure, the fourth terminal 220 is a negative terminal and is connected to the negative electrode of the internal battery, and the fifth terminals 230 are positive terminals and are connected to the positive electrode of the internal battery.

Further, in order to enable the output port of the terminal device 200 to transmit signals while providing electrical connection, the terminal device 200 further includes at least one pair of second signal terminals 240 corresponding to the first signal terminals 116 of the plug. Specifically, referring to FIG. 9, two pairs of second signal terminals 240 are accommodated in the above-mentioned plug slot 211, the two second signal terminals 240 in each pair of the second signal terminals 240 being distributed in central symmetry with the second terminal 220 as the center.

The embodiment described above provides a terminal device including a base 210, a fourth terminal 220, and a pair of fifth terminals 230, the pair of fifth terminals 230 being in central symmetry with the fourth terminal 220 as the center, the fourth terminal 220 being opposite in polarity to the fifth terminals 230. Thus, when the plug 110 provided by the embodiment described above is fit into the output port of the terminal device provided by this embodiment, the plug can be electrically connected no matter whether the plug is plugged in the forward direction (a first direction) or the reverse direction (a second direction).

In some embodiments, the terminal device is an emergency start device associated with a vehicle battery for charging and discharging the vehicle. Specifically, the emergency start device may be electrically connected to the vehicle battery via the electrical connector described above, the end of the electrical connector provided with the first terminal and the second terminals may be fitted into the output port of the emergency start device, the first terminal is connected to one of the positive electrode and the negative electrode of the internal battery of the emergency start device via the fourth terminal, and a pair of second terminals are connected to the other of the positive electrode and the negative electrode of the internal battery of the emergency start device via a pair of fifth terminals, so that the positive electrode and the negative electrode of the internal battery are connected to the plug; and the other end of the electrical connector may be connected to a terminal of the vehicle battery of the same polarity as the first terminal via the first wire (or the first wire and the first clamp), and at same time may be connected to an end of the vehicle battery having the same polarity as the second terminals via the second wire (or the second wire and the second clamp).

In some embodiments, the terminal device is a vehicle battery diagnosis device for detecting performance of the vehicle battery. Specifically, the vehicle battery diagnosis device may be electrically connected to the vehicle battery via the electrical connector described above, the end of the electrical connector provided with the first terminal and the second terminals may be fitted into the output port of the vehicle battery diagnosis device, the first terminal is connected to one of the positive electrode and the negative electrode of the internal battery of the vehicle battery diagnosis device via the fourth terminal, and a pair of second terminals are connected to the other of the positive electrode and the negative electrode of the internal battery of the vehicle battery diagnosis device via a pair of fifth terminals, so that the electrode positive and the negative electrode of the internal battery are connected to the plug; and the other end of the electrical connector may be connected to a terminal of the vehicle battery of the same polarity as the first terminal via the first wire (or the first wire and the first clamp), and at same time may be connected to an end of the vehicle battery having the same polarity as the second terminals via the second wire (or the second wire and the second clamp). In addition, the vehicle diagnosis device may also perform detection for battery performance by cooperation of the second signal terminals thereof and the first signal terminals of the electrical connector, where the first signal terminals and the second signal terminals in cooperation with each other have the same polarity and are used for transmitting a detection signal; in some embodiments, the first signal terminals are connected to the terminal of the vehicle battery of the same polarity as the first terminal via the first wire and the first clamp, and when the plug is fit into the output port, one of the positive electrode and the negative electrode of the internal battery of the same polarity as the first terminal is connected to the first signal terminals via the second signal terminals; and in other embodiments, the first signal terminals are connected to the terminal of the vehicle battery of the same polarity as the second terminals via the second wire and the second clamp, and when the plug is fit into the output port, one of the positive electrode and the negative electrode of the internal battery of the same polarity as the second terminals is connected to the first signal terminals via the second signal terminals.

It will be appreciated that the terminal device may be another device related to the vehicle battery, as long as it is provided with an output port and can be connected to the vehicle battery through the electrical connector described above, which is not limited herein.

Although there is only one pair of fifth terminals in the terminal device provided by the embodiment described above, it will be appreciated that there may be two or more pairs of fifth terminals, and the two or more pairs of fifth terminals may be arranged in one row with the fourth terminal serving as a symmetry center or in a plurality of rows with the fourth terminal serving as a symmetry center, where lines formed by each row of the fifth terminals intersect at the first terminal.

Furthermore, the terminal device 200 may further include a pair of sixth terminals (not shown). The pair of sixth terminals are fixedly arranged on the base 210, and correspond to the third terminals of the plug described above in the second embodiment. The pair of sixth terminals are arranged on the base 210, and the two sixth terminals in the pair of sixth terminals are distributed in central symmetry with the fourth terminal as the center. The sixth terminals are of the same polarity as the fourth terminal, and the sixth terminals are connected to the terminal of the internal battery of the same polarity as the fourth terminal. When the terminal device detects or charges or discharges the vehicle battery, the sixth terminal is connected to the terminal of the vehicle battery of the same polarity as the fourth terminal. Taking the fourth terminal being a positive terminal as an example, as multiple positive terminals are provided, even in the case where the fourth terminal 220 is poorly contacted or damaged, the electrical connection of the terminal device 200 still may be normally provided with the six terminals. It will be appreciated that the pair of sixth terminals may be arranged in one row with the fourth terminals and the fifth terminals, or may be staggered from the line formed by the pair of fifth terminals.

Similar to the structure of the plug described above, the terminal device also may include two or more pairs of sixth terminals, and in this case, the pairs of sixth terminals may be arranged in a common row and staggered from the second terminals, or may be arranged in a common row with the fourth terminal and the fifth terminals, or the pairs of sixth terminals may be arranged in different rows which intersect at the fourth terminal, which is not limited herein.

Finally, it should be noted that: the above embodiments are merely illustrative of the technical solution of the present disclosure, and are not limiting thereto. Combinations of features in the above embodiments or between different embodiments are also possible within the spirit of the disclosure, the steps can be implemented in any order, and many other variations of different aspects of the disclosure as described above are possible, which are not provided in detail for the sake of brevity. Although the present disclosure has been described in detail with reference to the foregoing embodiments, those skilled in the art will appreciate that: the technical solutions disclosed in the above-mentioned embodiments can still be modified or some of the technical features thereof can be replaced by equivalents; however, these modifications do not depart from the spirit and scope of the embodiments of the present disclosure.

The invention claimed is:

1. A plug for connection of a terminal device related to a vehicle battery, one end of the plug being fit into an output port of the terminal device while the other end of the plug being connected to the vehicle battery through two wires so as to enable the terminal device to detect or charge or discharge the vehicle battery, the plug comprising:
  an insulating housing;
  a first terminal, arranged in the insulating housing; and
  at least one pair of second terminals, arranged in the insulating housing, each pair of the second terminals being distributed in central symmetry with the first terminal as the center;
  wherein:
    the first terminal is opposite in polarity to the second terminals;
    the first terminal is connectable to a terminal of the vehicle battery of the same polarity as the first terminal via a first wire;
    the at least one pair of second terminals are connectable to the other terminal of the vehicle battery of the same polarity as the at least one pair of second terminals via a second wire;
    when the plug is fit into the output port, the first terminal is connected to one of a positive electrode and a negative electrode of an internal battery in the terminal device of the same polarity as the first terminal, and the at least one pair of second terminals are connected to one of the positive electrode and the negative electrode of the internal battery of the same polarity as the second terminals, so that the positive electrode and the negative electrode of the internal battery are connected to the vehicle battery via the plug and two wires;
    the plug is fit into the output port in either of a first direction and a second direction, the first direction being at 180 degrees from the second direction with the first terminal as a rotation center;
    at least one pair of third terminals, arranged in the insulating housing, wherein each pair of the third terminals are distributed in central symmetry with the first terminal as the center;
    the third terminals are of the same polarity as the first terminal, and the third terminals are connectable to the terminal of the vehicle battery of the same polarity as the first terminal via the first wire; and
    when the plug is fit into the output port, one of the positive electrode and the negative electrode of the internal battery of the same polarity as the first terminal is connected to the third terminals.

2. The plug according to claim 1, wherein the third terminals are arranged in a row.

3. The plug according to claim 1, wherein the first terminal, the second terminals, and the third terminals are arranged in a row.

4. The plug according to claim 1, further comprising:
  at least one pair of first signal terminals, each pair of the first signal terminals being distributed in central symmetry with the first terminal as the center;
  the first signal terminals are connectable to the terminal of the vehicle battery of the same polarity as the first terminal via the first wire, and when the plug is fit into the output port, one of the positive electrode and the negative electrode of the internal battery of the same polarity as the first terminal is connected to the first signal terminals; or the first signal terminals are connectable to the terminal of the vehicle battery of the same polarity as the second terminals via the second wire, and when the plug is fit into the output port, one of the positive electrode and the negative electrode of the internal battery of the same polarity as the second terminals is connected to the first signal terminals.

5. The plug according to claim 1, wherein one end of the insulating housing is provided with a plug slot, and the first terminal and all the second terminals are accommodated in the plug slot.

6. The plug according to claim 5, further comprising a flexible interconnecting piece connected to one end, away from the plug slot, of the insulating housing.

7. The plug according to claim 6, wherein the insulating housing is smaller than the flexible interconnecting piece in cross-sectional area in a part where the insulating housing is joint with the flexible interconnecting piece.

8. The plug according to claim 6, wherein the flexible interconnecting piece is made of polyvinyl chloride.

9. The plug according to claim 1, wherein the insulating housing is made of a mixture of nylon and glass fibers.

10. The plug according to claim 1, wherein the first terminal comprises a first fixing portion and first holding portions, one end of the first fixing portion is fixed to the insulating housing, and the other end of the first fixing portion is connected to at least two first holding portions, two adjacent first holding portions having a gap therebetween.

11. The plug according to claim 10, wherein the first holding portions of the same first terminal are arranged in a circle.

12. The plug according to claim 1, wherein the second terminal comprises a second fixing portion and second holding portions, one end of the second fixing portion is fixed to the insulating housing, and the other end of the second fixing portion is connected to at least two second holding portions, two adjacent second holding portions having a gap therebetween.

13. The plug according to claim 12, wherein all the second holding portions of the same second terminal are arranged in a circle.

14. An electrical connector, comprising a first wire, a second wire and a plug, one end of the plug being fit into an output port of the terminal device while the other end of the plug being connected to the vehicle battery through two wires so as to enable the terminal device to detect or charge or discharge the vehicle battery, the plug comprising:
  an insulating housing;
  a first terminal, arranged in the insulating housing; and
  at least one pair of second terminals, arranged in the insulating housing, each pair of the second terminals being distributed in central symmetry with the first terminal as the center;

wherein:
the first terminal is opposite in polarity to the second terminals;
the first terminal is connectable to a terminal of the vehicle battery of the same polarity as the first terminal via the first wire;
the at least one pair of second terminals are connectable to the other terminal of the vehicle battery of the same polarity as the at least one pair of second terminals via the second wire;
when the plug is fit into the output port, the first terminal is connected to one of a positive electrode and a negative electrode of an internal battery in the terminal device of the same polarity as the first terminal, and the at least one pair of second terminals are connected to one of the positive electrode and the negative electrode of the internal battery of the same polarity as the second terminals, so that the positive electrode and the negative electrode of the internal battery are connected to the vehicle battery via the plug and the two wires;
the plug is fit into the output port in either of a first direction and a second direction, the first direction being at 180 degrees from the second direction with the first terminal as a rotation center;
at least one pair of third terminals, arranged in the insulating housing, wherein each pair of the third terminals are distributed in central symmetry with the first terminal as the center;
the third terminals are of the same polarity as the first terminal, and the third terminals are connectable to the terminal of the vehicle battery of the same polarity as the first terminal via the first wire; and
when the plug is fit into the output port, one of the positive electrode and the negative electrode of the internal battery of the same polarity as the first terminal is connected to the third terminals; and
the first terminal being connected to the first wire which is connectable to the terminal of the vehicle battery of the same polarity as the first terminal, and the at least one pair of second terminals being connected to the second wire which is connectable to the terminal of the vehicle battery of the same polarity as the second terminals.

15. The electrical connector according to claim 14, further comprising a first clamp and a second clamp, the first clamp being electrically connected to the first wire and used for fixedly connecting the terminal of the vehicle battery of the same polarity as the first terminal, the second clamp being electrically connected to the second wire and used for fixedly connecting the terminal of the vehicle battery of the same polarity as the second terminals.

16. A terminal device for detecting a vehicle battery, the terminal device comprising an internal battery, the terminal device being provided with an output port, the output port comprising:
a base,
a first terminal, arranged on the base; and
at least one pair of second terminals, arranged on the base, each pair of second terminals being distributed in central symmetry with the first terminal as the center;
at least one pair of third terminals, arranged on the base, each pair of the second terminals being distributed in central symmetry with the first terminal as the center; and
the second terminals are of the same polarity as the first terminal, and the second terminals are connectable to a terminal of the vehicle battery of the same polarity as the first terminal; and
wherein
the first terminal is opposite in polarity to the second terminals;
the first terminal is connected to one of a positive electrode and a negative electrode of the internal battery, and the at least one pair of second terminals are connected to the other of the positive electrode and the negative electrode of the internal battery;
when the terminal device detects the vehicle battery, the first terminal is connected to a terminal of the vehicle battery of the same polarity as the first terminal, and the at least one pair of second terminals are connected to a terminal of the vehicle battery of the same polarity as the at least one pair of second terminals; and
when the terminal device detects the vehicle battery, the second terminal is connected to the terminal of the vehicle battery of the same polarity as the first terminal.

17. The terminal device according to claim 16, further comprising:
at least one pair of signal terminals, each pair of signal terminals being distributed in central symmetry with the first terminal as the center;
the signal terminals are connected to one of the positive electrode and the negative electrode of the internal battery of the same polarity as the first terminal; or, the signal terminals are connected to one of the positive electrode and the negative electrode of the internal battery of the same polarity as the at least one pair of second terminals.

18. The terminal device according to claim 16, wherein one end of the first terminal away from a joint of the first terminal and the base is provided with a first clamping hole; and/or one end of the second terminal away from a joint of the second terminal and the base is provided with a second clamping hole.

* * * * *